United States Patent
Uchii et al.

(10) Patent No.: US 7,029,519 B2
(45) Date of Patent: Apr. 18, 2006

(54) SYSTEM AND METHOD FOR GAS RECYCLING INCORPORATING GAS-INSULATED ELECTRIC DEVICE

(75) Inventors: Toshiyuki Uchii, Kanagawa-ken (JP); Katsumi Suzuki, Kanagawa-ken (JP); Motoharu Shiiki, Kangawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 236 days.

(21) Appl. No.: 10/670,793

(22) Filed: Sep. 26, 2003

(65) Prior Publication Data
US 2004/0123993 A1    Jul. 1, 2004

(51) Int. Cl.
*B01D 53/04* (2006.01)
*B01D 53/48* (2006.01)

(52) U.S. Cl. ............... 95/139; 95/273; 96/135; 96/142; 55/385.6; 174/16.1; 174/17 GF; 174/17 VA

(58) Field of Classification Search ........... 55/385.1, 55/385.5, 385.6, 385.7; 95/139, 273, 287, 95/138; 96/108, 142, 134–136, 143; 174/16.1, 174/17 GF, 17 VA, 139
See application file for complete search history.

(56) References Cited

U.S. PATENT DOCUMENTS

| | | | | |
|---|---|---|---|---|
| 1,697,141 A | * | 1/1929 | Rodman et al. ........... 174/12 R |
| 2,853,540 A | * | 9/1958 | Camilli et al. .......... 174/17 GF |
| 2,867,679 A | * | 1/1959 | Cobine .................... 174/17 R |
| 2,989,577 A | * | 6/1961 | Berg ........................ 174/15.1 |
| 3,048,648 A | * | 8/1962 | Plump et al. ........... 174/17 GF |
| 3,506,774 A | * | 4/1970 | Gard et al. ............. 174/17 GF |
| 3,674,696 A | * | 7/1972 | Griffiths ..................... 336/94 |
| 4,052,555 A | * | 10/1977 | Mears et al. ............ 174/17 GF |
| 4,071,461 A | * | 1/1978 | Mears et al. .............. 252/571 |
| 4,204,084 A | * | 5/1980 | Mastroianni et al. ..... 174/25 G |
| 4,288,651 A | * | 9/1981 | Wootton .................. 174/17 GF |
| 4,295,734 A | * | 10/1981 | Tsuda et al. ................. 399/355 |
| 4,296,003 A | * | 10/1981 | Harrold et al. ............. 252/570 |
| 4,336,414 A | * | 6/1982 | Suzuki et al. ............. 174/14 R |
| 4,380,211 A | * | 4/1983 | Shinohara ................... 118/718 |
| 4,394,635 A | * | 7/1983 | Foss ........................... 336/55 |
| 4,410,456 A | * | 10/1983 | Nelson ....................... 252/571 |
| 4,433,081 A | * | 2/1984 | Britsch ....................... 523/457 |
| 4,435,194 A | * | 3/1984 | Picard et al. .................. 95/19 |
| 4,440,971 A | * | 4/1984 | Harrold ................. 174/17 GF |
| 4,511,873 A | * | 4/1985 | Baier et al. ................. 336/90 |
| 4,547,316 A | * | 10/1985 | Yamauchi ................... 252/571 |
| 4,565,901 A | | 1/1986 | Hirooka et al. |
| 4,665,707 A | * | 5/1987 | Hamilton ...................... 62/3.3 |
| 5,252,778 A | * | 10/1993 | Ogawa ....................... 174/16.1 |

(Continued)

FOREIGN PATENT DOCUMENTS

DE    2 226 628    12/1973

(Continued)

OTHER PUBLICATIONS

"$SF_6$ Gas Handling Standard for Electricity", Electric Technology Research Association, vol. 54, No. 3, Dec. 21, 1998, Japan.

(Continued)

*Primary Examiner*—Robert H. Spitzer
(74) *Attorney, Agent, or Firm*—Foley & Lardner LLP

(57) ABSTRACT

A gas recycling system which has a carbon dioxide collecting device for collecting gas containing carbon dioxide from a carbon dioxide source. In the system, at least part of the gas containing sulfur hexafluoride used as an electric insulation medium in a gas-insulated electric device is replaced with the carbon dioxide obtained by the carbon dioxide collecting device.

12 Claims, 3 Drawing Sheets

U.S. PATENT DOCUMENTS

| | | | |
|---|---|---|---|
| 5,451,248 A * | 9/1995 | Sadkowski et al. | 95/99 |
| 5,467,722 A | 11/1995 | Meratla | |
| 5,785,741 A * | 7/1998 | Li et al. | 96/4 |
| 5,925,167 A * | 7/1999 | Smith | 95/11 |
| 6,075,204 A * | 6/2000 | Celauro et al. | 174/17 GF |
| 6,304,444 B1 * | 10/2001 | Combs et al. | 361/695 |
| 6,740,147 B1 * | 5/2004 | Kishkovich et al. | 96/135 |
| 2002/0092281 A1 * | 7/2002 | Choi et al. | 55/385.1 |

FOREIGN PATENT DOCUMENTS

| | | |
|---|---|---|
| EP | 1 146 522 A1 | 10/2001 |
| GB | 393226 | 6/1933 |

OTHER PUBLICATIONS

Patent Abstracts of Japan, vol. 2002, No. 03, Apr. 3, 2002, JP 2001-314008, Nov. 9, 2001.

* cited by examiner

SYSTEM AND METHOD FOR GAS RECYCLING INCORPORATING GAS-INSULATED ELECTRIC DEVICE

BACKGROUND OF THE INVENTION

This invention is related to a system and a method for recycling sulfur hexafluoride ($SF_6$) gas and carbon dioxide ($CO_2$) gas which are used in gas-insulated electric devices and, a sulfur hexafluoride supplying system.

Main global warming gases used in electric power supply industry include carbon dioxide gas exhausted from power generation plants and sulfur hexafluoride gas used as electric insulating medium in high voltage substations.

Emission of carbon dioxide has been increasing due to increase of energy consumption of energy accompanied by development of information technology and people's seeking for comfort. Electric power industry exhausts carbon dioxide gas mainly through thermal electric power generation plants. Various methods for collecting carbon dioxide have been studied, and various methods have been proposed including chemical adsorption method using amine, physical method such as molecular adsorption method, and method using absorption material of complex oxide.

On the other hand, sulfur hexafluoride gas is known to be extremely stable, inert, colorless, odorless, harmless and unburnable. Therefore, sulfur hexafluoride gas is used for various purposes such as electric insulation in electric power devices, etching in semiconductor production process, aluminum refining, noise insulation, electron beam accelerators, shoe soles and shock absorbers. Especially, application of sulfur hexafluoride gas to electric power devices utilizing its good electric insulation characteristics has rapidly prevailed as a key technology to respond to electric power demand recently. Typical electric devices utilizing sulfur hexafluoride gas as insulation medium include gas-insulated switchgears (GISs).

However, sulfur hexafluoride gas is accused of having a high global warming potential—23,900 times higher than carbon dioxide gas. Therefore, the electric power supply industry promotes collecting and recycling sulfur hexafluoride gas, and makes efforts to suppress emission of the sulfur hexafluoride gas to the atmosphere. Besides, alternative gas that can be substituted to sulfur hexafluoride gas as insulation gas of harmless to the environment is searched for.

As a countermeasure of global warming, emission of global warming gas should be suppressed globally. According to "$SF_6$ Gas Handling Standard for Electricity", Electric Technology Research Association, Vol. 54, No. 3, Dec. 21, 1998, Japan, total amount of sulfur hexafluoride gas that is used as electric insulation medium in electric power devices in Japan was 6,400 tons in 1995. Since the sulfur hexafluoride gas used for electric power devices is confined in sealed tanks, emission to the atmosphere is limited during normal operation. However, in a long range perspective, the newly produced gas will be emitted to the atmosphere in the end, if the gas is not decomposed. Therefore, ultimate solution to the global warming would be minimizing new production of the gas.

Decomposition of sulfur hexafluoride gas theoretically possible by overheating decomposition. However, it is not practical to decompose sulfur hexafluoride gas today because it requires a large amount of energy. The electric power supply industry produces 2,400 tons of sulfur hexafluoride gas in a year in Japan, although the electric power supply industry is trying to collect and recycle the gas. Therefore, reduction of new production of sulfur hexafluoride gas is important to prevent global warming.

Amount of order of hundred million tons of carbon dioxide gas is emitted from electric power generation plants in 1995 in Japan. On the other hand, gas manufacturers newly produce and supply carbon dioxide gas to industries that need it.

Thus, carbon dioxide gas and sulfur hexafluoride gas are newly produced and emitted to the atmosphere, which adversely affects global warming.

BRIEF SUMMARY OF THE INVENTION

Accordingly, it is an object to minimize amount of emission of those global warming gases to the atmosphere by recycling the gases while securing required amount of supply of carbon dioxide gas and/or sulfur hexafluoride gas.

There has been provided, in accordance with an aspect of the present invention, a gas recycling system comprising: carbon dioxide collecting means for collecting gas containing carbon dioxide from a carbon dioxide source; and replacing means for replacing at least part of gas containing sulfur hexafluoride used as an electric insulation medium in a gas-insulated electric device, with the carbon dioxide obtained by the carbon dioxide collecting means.

There has also been provided, in accordance with another aspect of the present invention, a gas recycling method comprising: collecting gas containing carbon dioxide from a carbon dioxide source; and replacing at least part of gas containing sulfur hexafluoride used as an electric insulation medium in a gas-insulated electric device, with the carbon dioxide obtained by the carbon dioxide collecting step.

There has also been provided, in accordance with another aspect of the present invention, a gas-insulated electric device comprising: at least one electric conductor; a tank containing the at least one electric conductor; a solid insulator connected to the tank; and insulation gas sealed in the tank, wherein the insulation gas includes carbon dioxide which has been stored after being collected as gas containing carbon dioxide from a carbon dioxide source and increased in carbon dioxide purity in the gas containing carbon dioxide.

There has also been provided, in accordance with another aspect of the present invention, a sulfur hexafluoride supplying system comprising: collecting means for collecting gas containing sulfur hexafluoride emitted from a gas-insulated electric device by replacing the gas containing sulfur hexafluoride with an electric insulation gas having a lower global warming potential than the gas containing sulfur hexafluoride; refining means for increasing purity of sulfur hexafluoride in the gas containing sulfur hexafluoride collected by the collecting means; and a container for storing the gas containing sulfur hexafluoride increased in purity of sulfur hexafluoride by the refining means.

There has also been provided, in accordance with another aspect of the present invention, a gas-insulated electric device comprising: at least one electric conductor; a tank containing the at least one electric conductor; a solid insulator connected to the tank; and insulation gas sealed in the tank, the insulation gas having a lower global warming potential than sulfur hexafluoride, wherein at least part of the tank was used for containing sulfur hexafluoride as an electric insulation medium.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

[Gas Recycling System]

Figure 1:
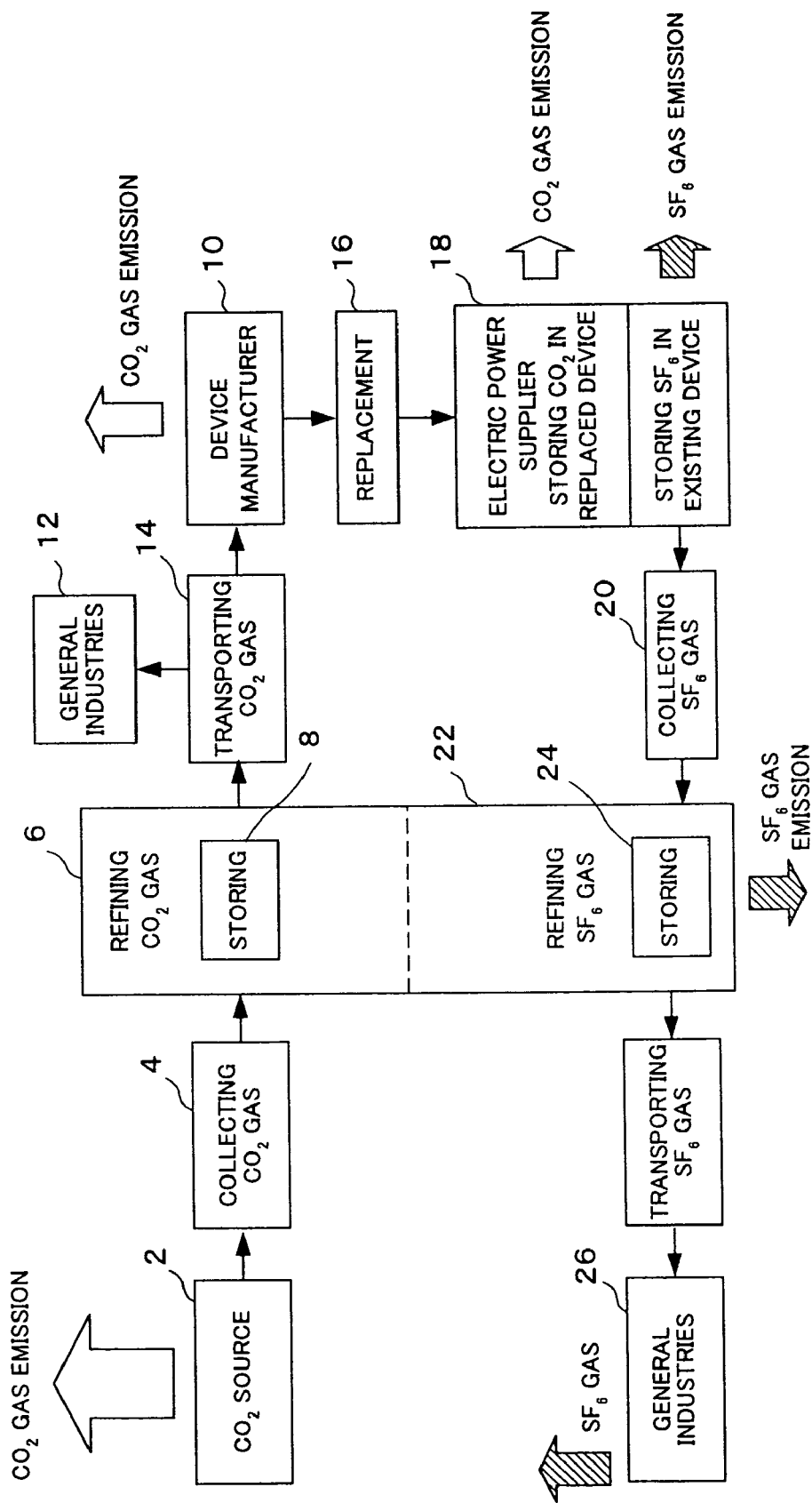
FIG. 1 is a schematic block diagram showing an embodiment of a gas recycling system according to the present invention.

Now an embodiment of a gas recycling system according to the present invention is described referring to FIG. 1. The carbon dioxide source 2 shown in FIG. 1 may include thermal electric power generation plants and other general industries.

Carbon dioxide collecting means 4 is provided for collecting the exhaust gas, including carbon dioxide gas, emitted from the carbon dioxide source 2, and introducing the gas into carbon dioxide refining means 6. Optionally, the carbon dioxide collecting means 4 may include adsorption towers filled with adsorbent such as zeolite. The carbon dioxide refining means 6 is provided to enhance purity of carbon dioxide and/or to eliminate impurities from the gas collected by the carbon dioxide collecting means 4. The refining of carbon dioxide refining means 6 is, for example, at least one of removing impurities such as dust contained in the gas by dust filters, and reducing the concentration of components other than carbon dioxide by physical absorption or chemical absorption. The physical absorption is performed by introducing the gas into an adsorption tower filled with adsorbent such as zeolite, for example. The chemical absorption is performed by introducing the gas into calcium hydroxide solution, amine, or lithium-containing oxide. For example, when the gas including carbon dioxide is introduced into calcium hydroxide solution, the chemical absorption of carbon dioxide is performed based on an action indicated by the formula:

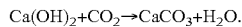

$$Ca(OH)_2 + CO_2 \rightarrow CaCO_3 + H_2O.$$

Furthermore, carbon dioxide storing means 8 is provided for storing the collected and refined carbon dioxide gas by liquidation, for example. The carbon dioxide storing means 8 may include compressors and containers such as steel bottles, for example. The carbon dioxide may be stored in gas or solid states rather than in liquid state.

The carbon dioxide collecting means 4, the carbon dioxide refining means 6 and the carbon dioxide storing means 8 may be disposed in a thermal electric power generation plant, for example.

The stored liquefied gas in the carbon dioxide storing means 8 is transported to electric device manufacturers 10 of electric devices and to general industries 12 by gas transport means 14 such as trucks. The device manufacturers 10 use the carbon dioxide gas as electric insulation medium. The electric devices manufactured by the device manufacturers 10 are transported to electric power suppliers 18 by device transport means such as trailer trucks. Then, replacement 16 of existing electric devices using sulfur hexafluoride gas by the electric devices using carbon dioxide gas is conducted. The replacement 16 will be discussed later in detail referring to FIG. 2.

The electric power suppliers 18 have electric devices using sulfur hexafluoride gas as electric insulation medium in their substations. The sulfur hexafluoride gas that has been used in the existing electric devices as an electric insulation medium is collected by sulfur hexafluoride collecting means 20 such as electric pumps. The collected sulfur hexafluoride gas is purified, and the impurities are eliminated by sulfur hexafluoride refining means 22.

The refining of the sulfur hexafluoride refining means 22 is, for example, at least one of removing impurities such as dust contained in the gas by dust filters, reducing the concentration of components other than sulfur hexafluoride by adsorption, and separation of sulfur hexafluoride from other components by selectively liquefying the sulfur hexafluoride. The adsorption is performed by introducing the gas into a refining tower filled with adsorbent such as zeolite. The selective liquefying of sulfur hexafluoride is performed by controlling the temperature and the pressure of the gas, with using the property that the boiling point of sulfur hexafluoride is relatively high. The collected and refined sulfur hexafluoride gas is liquefied and stored by sulfur hexafluoride storing means 24. The sulfur hexafluoride storing means 24 may include compressors and containers.

Typically, sulfur hexafluoride collecting and refining facilities including the electric pumps, dust filters and compressors may be disposed in substations controlled by the electric power suppliers 18, while the sulfur hexafluoride refining means 22 and the sulfur hexafluoride storing means 24 may be disposed in premises of gas manufacturers.

The refined sulfur hexafluoride gas or liquefied gas may be reused in general industries 26 for purposes other than electric insulation. The general industries 26 here may include etching in semiconductor production process, aluminum refining, noise insulation, electron beam accelerators, shoe soles and shock absorbers.

Now operation of the gas recycling system shown in FIG. 1 is discussed. High temperature exhaust gas from the carbon dioxide source 2 such as a thermal electric power plant may include carbon dioxide gas as well as steam and nitrogen gas. The exhaust gas is cooled to atmospheric temperature and introduced into adsorption towers filled with adsorbent such as zeolite. Thus, carbon dioxide is separated and collected. Then, the adsorption tower is depressurized and optionally heated for the carbon dioxide gas to detach from the adsorbent, which constitutes carbon dioxide collecting means 4.

The detached carbon dioxide is filtered through the carbon refining means 6 such as dust filters to eliminate impurities, and optionally to enhance the purity. The refined carbon dioxide is liquefied by the compressors and stored in the carbon dioxide storing means 8 such as containers. The liquefied carbon dioxide gas stored in the containers is supplied to the device manufacturers 10 by the gas transporting means 14 such as trucks. The liquefied carbon dioxide gas stored in the containers may be optionally supplied also to the general industries 12 other than electric device manufacturers.

The device manufacturers 10 may use the carbon dioxide supplied this way as a single electric insulation medium or as a mixture with other gases in manufacturing electric power devices such as gas-insulated switchgears and transformers. The electric power devices manufactured in this way are transported to the substations of the electric suppliers 18 by transport systems such as trailer trucks. The electric power devices using the carbon dioxide gas are replaced as substitutes to the existing electric power devices using sulfur hexafluoride gas as electric insulation medium in the substations, by replacement 16.

Then, sulfur hexafluoride gas which was used in the old electric power devices is collected from the existing electric power devices by sulfur hexafluoride collecting means 20 or sulfur hexafluoride collecting-refining devices which may include dust filters, electric pumps and compressors, for example. Then the sulfur hexafluoride gas refined by the gas collecting-refining devices is liquefied and stored in the containers.

The used sulfur hexafluoride gas stored in the containers is transported to gas manufacturers by trucks. The used sulfur hexafluoride gas transported to the gas manufacturers are refined to eliminate impurity gases by the sulfur hexafluoride refining means 22 including refining towers filled with adsorbent such as zeolite.

The gas manufactures liquefy the refined sulfur hexafluoride by the compressors and store it in the sulfur hexafluoride storing means 24 such as containers. Then the gas manufactures supply the sulfur hexafluoride gas which was refined, liquefied and stored in the containers to the general industries 26 such as semiconductor manufacturing industries which need sulfur hexafluoride gas in lieu of newly produced gas.

In the substations, parts of the old electric power devices in which the sulfur hexafluoride gas was contained and replaced by the new electric power devices containing carbon dioxide are transported to the device manufacturers by trailer truck etc. Then, the reusable parts such as tanks are reused after required treatment such as re-paining. Additional carbon dioxide is not emitted in this system because the carbon dioxide gas used here as electric insulation medium obtained by collecting and refining carbon dioxide that is originally emitted from the thermal electric power plants.

Alternatively, the carbon dioxide gas collected from the carbon dioxide source 2 may be mixed with another gas which has a higher electric insulation performance so that the electric power devices may have insulation gas with higher electric insulation performance than carbon dioxide gas. In such a case, global warming effect can be alleviated compared with the conventional electric power devices using sulfur hexafluoride gas, if the global warming potential of the mixture is smaller than that of sulfur hexafluoride gas.

In the embodiment described above, the carbon dioxide collecting means 4, the carbon dioxide refining means 6 and the carbon dioxide storing means 8 are disposed in a same premises as the thermal electric power generation plant or the carbon dioxide gas source 2, and the electric power supplier conducts operations of collecting, refining and storing the carbon dioxide gas. However, those operations may be alternatively conducted by gas manufacturers or device manufacturers. Furthermore, those operations may be alternatively conducted in the substations and the produced sulfur hexafluoride gas may be supplied to the general industries 26 directly from the substations. Various separation of roles may be possible in operation of this gas recycling system.

According to the embodiment of the gas recycling system of the present invention described above, carbon dioxide gas and sulfur hexafluoride gas can be effectively recycled. Then, emission to the atmosphere and new production of the global warming gas such as carbon dioxide gas and sulfur hexafluoride gas are minimized while required amounts of the gases are supplied.

[Replacement of Gas-Insulated Electric Devices]

Figure 2:
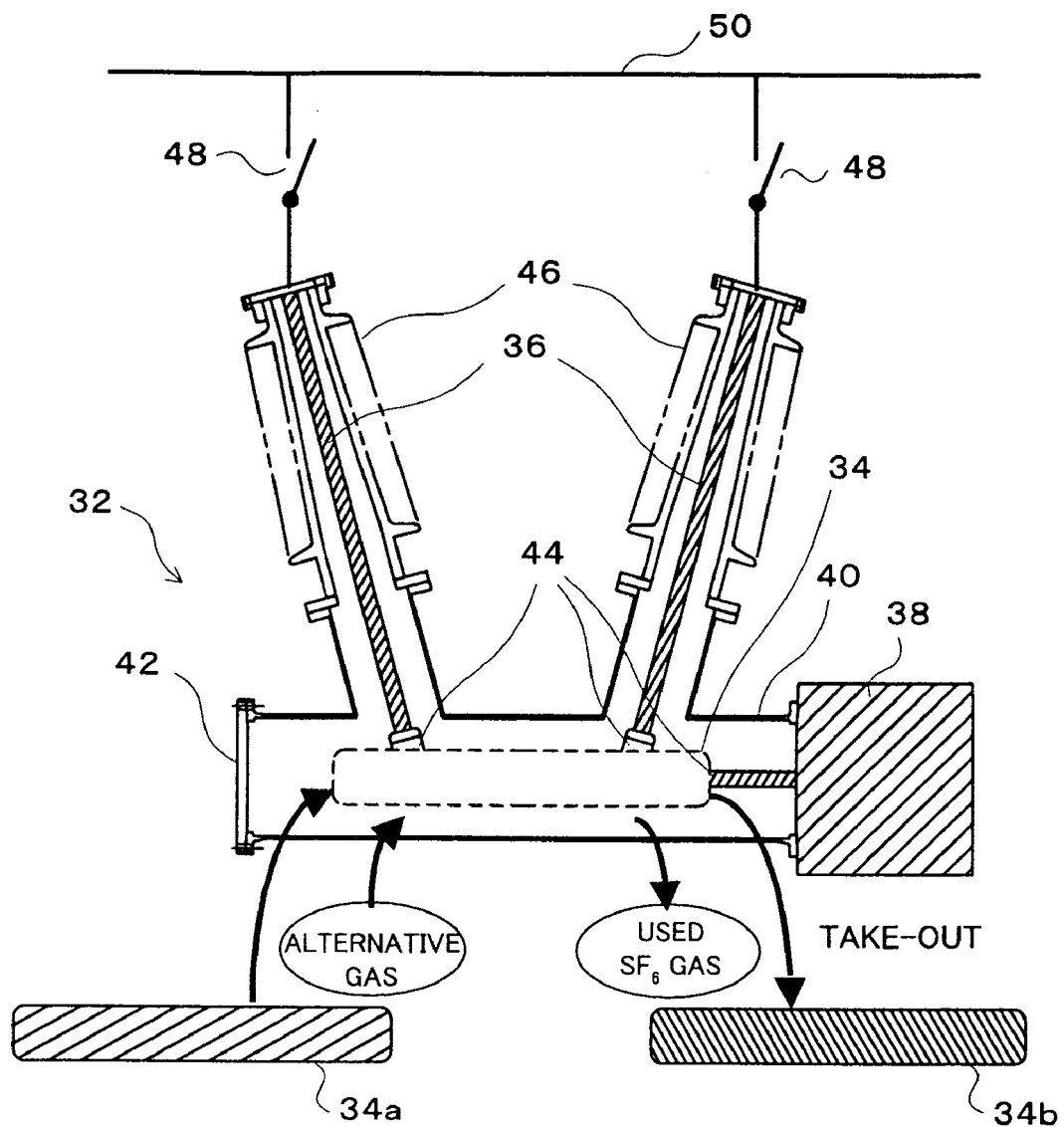
FIG. 2 is a schematic elevational cross-sectional view showing an embodiment of a replacing system of a gas-insulated electric device in the gas recycling system shown in FIG. 1.

Now the replacement 16 of gas-insulated electric devices in the substations of the electric power suppliers 18 in the gas recycling system shown in FIG. 1 is described referring to FIG. 2. The gas-insulated electric devices to be replaced may include gas-insulated circuit breakers, gas-insulated switchgears and transformers. Replacement of a gas-insulated circuit breaker 32 is discussed here as an example.

The gas-insulated circuit breaker 32 has an arc-extinguishing chamber 34 in which electric current is cut by opening contact electrodes (not shown), and electric conductors 36 which constitute a circuit. The gas-insulated circuit breaker 32 also has a drive mechanism 38 for opening the electrodes, gas used as electric insulation and arc-extinguishing medium, and a tank 40 for sealing the arc-extinguishing chamber 34 and the gas. The tank 40 has a lid 42 which can be opened and closed, through which inspection and cleaning can be conducted in the tank 40. An existing conventional gas-insulated circuit breaker uses sulfur hexafluoride gas as the electric insulation and arc-extinguishing medium. As shown in FIG. 2, insulation tubes 46 as solid insulators are connected to the tank 40 and disposed outside of the electric conductors 36, and the electric conductors 36 are connected to electric power supply network 50 via disconnecting switches 48.

On the other hand, alternative gas having a lower global warming potential than sulfur hexafluoride gas is prepared. The alternative gas may be carbon dioxide gas or mixed gas containing carbon dioxide gas, for example. A newly produced arc-extinguishing chamber 34a is also prepared which has been designed to suite for the insulation and ark-distinguishing performances of the alternative gas. The new arc-extinguishing chamber 34a is different from the conventional arc-extinguishing chamber 34b which was designed to use sulfur hexafluoride gas.

In general, insulation and ark-distinguishing performances (or circuit breaking performance) of electric power devices depend on the insulation medium and the ark-distinguishing medium that are used. Therefore, the ark-distinguishing chamber 34 must be designed and produced to match the performance of the insulation and ark-distinguishing medium that is used. However, the other parts including the electric conductors 36, the tank 40 and the driving mechanism 38 can be reused even with different gas, because the performance of those parts hardly depend on the gases. The construction of the joint portions 44 of the new arc-extinguishing chamber 34a for alternative gas that may fit to the electric conductors 36 and the drive mechanism 38 are common to the joint portions 44 of the existing arc-extinguishing chamber 34b for sulfur hexafluoride gas.

Now replacement operation of the gas-insulated electric device shown in FIG. 2 is described. First, the disconnecting switches 48 connected to both ends of the gas-insulated circuit breaker 32 are opened, so that the gas-insulated circuit breaker 32 may be electrically separated from the electric power supply network 50. Then, the metal portion of the gas-insulated circuit breaker 32 is grounded for safety.

Then, the sulfur hexafluoride gas in the tank 40 is collected using the electric pump as explained referring to FIG. 1. After the sulfur hexafluoride gas is collected, the tank 40 is filled with atmospheric air.

After the tank 40 is filled with the atmospheric air, the lid 42 of the tank is opened, the joint portions 44 connected to the electric conductors 36 and the drive mechanism 38 are detached, and the arc-extinguishing chamber 34b for sulfur hexafluoride gas is removed out of the tank 40.

Then, the arc-extinguishing chamber 34a for alternative gas is inserted into the tank 40, and is connected to the electric conductors 36 and the drive mechanism 38 with the joint portions 44. Since the constructions of the joint portions 44 of the arc-extinguishing chamber 34a for alternative gas are common to the joint portions 44 of the arc-extinguishing chamber 34b for sulfur hexafluoride gas, the joint portions 44 can be easily connected. After the arc-extinguishing chamber 34a for alternative gas is set and connected in the tank 40, it is checked that there are no foreign substances in the tank 40 that might deteriorate electric insulation performance. Then, the inside of the tank 40 is cleaned if necessary.

Then, the lid 42 of the tank is firmly closed, the tank 40 is vacuated, and then, the tank 40 is filled with alternative gas at a stipulated pressure. The alternative gas has a global warming potential that is smaller than sulfur hexafluoride gas.

Thus, the arc-extinguishing chambers are changed with the replacement of gases from sulfur hexafluoride gas to alternative gas, while the electric conductors 36, the tank 40 and the drive mechanism 38 are not changed that are not affected much by the gas change.

According to the present gas recycling system as explained above, the gas-insulated electric devices can be replaced easily and quickly, and the substation shutdown time for the replacement work can be minimized. In addition, some parts are reused, and number of newly produced parts for the gas recycling system can be minimized, which results in minimal adverse effects on global environment.

In the embodiment described above, the component parts other than the ark-distinguishing chamber such as the electric conductors 36, the tank 40 and the drive mechanism 38 are reused without being moved from the substation. However, those reusable parts may be moved out by the device manufacturers etc., and may be reused after maintenance work such as re-painting. Besides, component parts other than the electric conductors, the tank and the drive mechanism may be reusable.

[Gas Management System]

Figure 3:
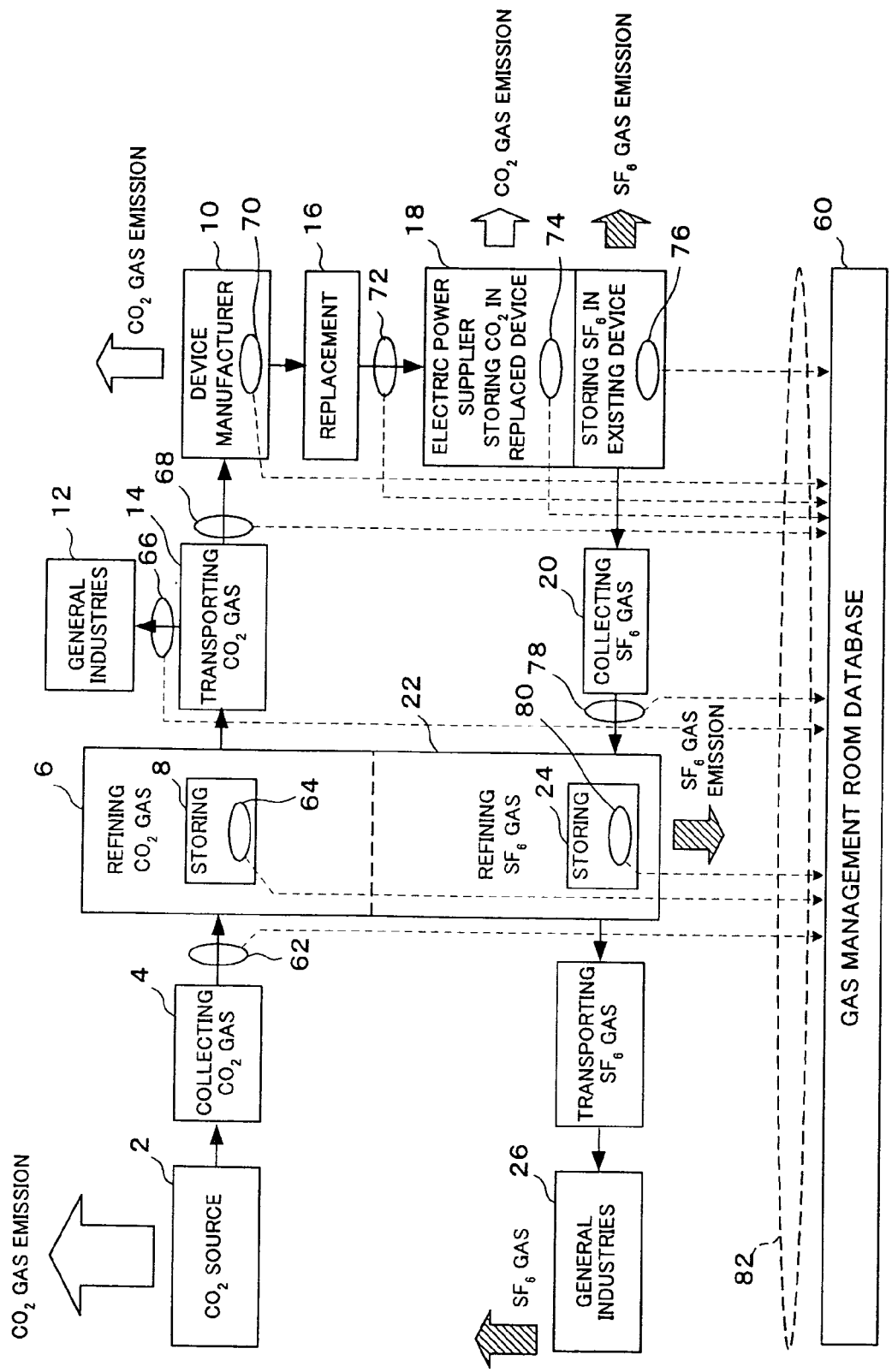
FIG. 3 is a schematic block diagram showing an embodiment of a gas management system in the gas recycling system shown in FIG. 1.

Now gas management system for the gas recycling system shown in FIG. 1 is described referring to FIG. 3. Basic construction is the same as the system shown in FIG. 1. The common parts in FIG. 3 are assigned common numerals as in FIG. 1, and repetitive description is omitted here. In FIG. 3, the ovals connected to a gas management room database 60 show recording means of the data.

The gas management room database 60 is connected to the recording means 62 to 80 via the network 82.

The recording means includes: means 62 for recording the amount of the carbon dioxide collected by the carbon dioxide collecting means 4, means 64 for recording the amount of carbon dioxide stored by the carbon dioxide storing means 8, means 66 for recording the amount of carbon dioxide supplied to the general industries 12, means 68 for recording the amount of carbon dioxide supplied to the device manufacturers 10, means 70 for recording the amount of carbon dioxide stored by the device manufacturers 10, and means 72 for recording the amount of carbon dioxide sealed in the devices as electric insulation gas which is supplied to the substations of the electric power suppliers 18.

The recording means further includes: means 74 for recording the amount of carbon dioxide stored in the sealed devices in the substations as insulation gas, means 76 for recording the amount of sulfur hexafluoride stored in the sealed devices as insulation gas, means 78 for recording the amount of sulfur hexafluoride used and collected by the sulfur hexafluoride collecting means 20, means 80 for recording the amount of sulfur hexafluoride which has been liquefied and stored by the sulfur hexafluoride storing means after the refinement.

The recording means may include management of the gas input and output with notebooks, and inputting their data to the terminal computers connected to a network. The gas amount data entered into the terminal computers are summarized and recorded in the database 60 in the gas management room via the network 82.

Now the operation of the gas management system shown in FIG. 3 is described. In this gas management system, the flows of gases are collectively monitored, and the amount of sufficiency or deficiency of the carbon dioxide gas and the sulfur hexafluoride gas at various points in the gas recycling system can be monitored on a real time basis. In addition, the approximate amount of the emission of the gases to the atmosphere at each point can be calculated from the gas input and output.

Thus, according to the present gas management system, required amount of gases can be supplied to the appropriate places. In addition, the effect of the gas recycling system on the global warming can be monitored, because the atmospheric emission of the gases are approximately calculated.

Numerous modifications and variations of the present invention are possible in light of the above teachings. It is, therefore, to be understood that, within the scope of the appended claims, the present invention may be practiced in a manner other than as specifically described herein.

What is claimed is:

1. A gas recycling system comprising:
   carbon dioxide collecting means for collecting gas containing carbon dioxide from a carbon dioxide source; and
   replacing means for replacing at least part of gas containing sulfur hexafluoride used as an electric insulation medium in a gas-insulated electric device, with the carbon dioxide obtained by the carbon dioxide collecting means.

2. The gas recycling system according to claim 1, further comprising:
   sulfur hexafluoride collecting means for collecting gas containing sulfur hexafluoride which was used in the gas-insulated electric device and was replaced with the carbon dioxide;
   sulfur hexafluoride refining means for increasing sulfur hexafluoride purity in the gas containing sulfur hexafluoride obtained by the sulfur hexafluoride collecting means; and
   means for reutilizing the sulfur hexafluoride gas obtained by the sulfur hexafluoride refining means, for a purpose other than electric insulation.

3. The gas recycling system according to claim 1, further comprising:
   carbon dioxide refining means for increasing carbon dioxide purity in the gas containing carbon dioxide gas obtained by the carbon dioxide collecting means, wherein the replacing means is constructed to replace the at least part of gas containing sulfur hexafluoride with the carbon dioxide obtained by the carbon dioxide collecting means.

4. The gas recycling system according to claim 1, wherein the carbon dioxide source includes an electric power generation device.

5. A gas recycling method comprising:
collecting gas containing carbon dioxide from a carbon dioxide source; and
replacing at least part of gas containing sulfur hexafluoride used as an electric insulation medium in a gas-insulated electric device, with the carbon dioxide obtained by the carbon dioxide collecting step.

6. The gas recycling method according to claim 5, further comprising:
collecting gas containing sulfur hexafluoride which was used in the gas-insulated electric device and was replaced with the carbon dioxide;
increasing sulfur hexafluoride purity in the gas containing sulfur hexafluoride obtained by the sulfur hexafluoride collecting step; and
reutilizing the sulfur hexafluoride gas obtained by the sulfur hexafluoride purity increasing step, for a purpose other than electric insulation.

7. The gas recycling method according to claim 5, further comprising:
increasing carbon dioxide purity in the gas containing carbon dioxide gas obtained by the carbon dioxide collecting step, wherein
the replacing step is constructed to replace the at least part of gas containing sulfur hexafluoride with the carbon dioxide obtained by the carbon dioxide purity increasing step.

8. The gas recycling method according to claim 5, wherein the carbon dioxide source includes an electric power generation device.

9. A gas-insulated electric device comprising:
at least one electric conductor;
a tank containing the at least one electric conductor;
a solid insulator connected to the tank; and
insulation gas sealed in the tank,
wherein the insulation gas includes carbon dioxide which has been stored after being collected as gas containing carbon dioxide from a carbon dioxide source and increased in carbon dioxide purity in the gas containing carbon dioxide.

10. A sulfur hexafluoride supplying system comprising:
collecting means for collecting gas containing sulfur hexafluoride emitted from a gas-insulated electric device by replacing the gas containing sulfur hexafluoride with an electric insulation gas having a lower global warming potential than the gas containing sulfur hexafluoride;
refining means for increasing purity of sulfur hexafluoride in the gas containing sulfur hexafluoride collected by the collecting means; and
a container for storing the gas containing sulfur hexafluoride increased in purity of sulfur hexafluoride by the refining means.

11. The sulfur hexafluoride supplying system according to claim 10, further comprising:
means for recording amount of the gas having a lower global warming potential than the gas containing sulfur hexafluoride;
means for recording amount of the gas containing sulfur hexafluoride stored in the gas-insulated electric device;
means for recording amount of the gas containing sulfur hexafluoride which is collected by the collecting means; and
means for recording amount of the gas containing sulfur hexafluoride stored in the container.

12. A gas-insulated electric device comprising:
at least one electric conductor;
a tank containing the at least one electric conductor;
a solid insulator connected to the tank; and
insulation gas sealed in the tank, the insulation gas having a lower global warming potential than sulfur hexafluoride,
wherein at least part of the tank was used for containing sulfur hexafluoride as an electric insulation medium.

* * * * *